US009736678B2

(12) United States Patent
Li et al.

(10) Patent No.: US 9,736,678 B2
(45) Date of Patent: *Aug. 15, 2017

(54) TAMPER PREVENTION FOR ELECTRONIC SUBSCRIBER IDENTITY MODULE (ESIM) TYPE PARAMETERS

(71) Applicant: Apple Inc., Cupertino, CA (US)

(72) Inventors: Li Li, Los Altos, CA (US); Xiangying Yang, Cupertino, CA (US)

(73) Assignee: Apple Inc, Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/362,732

(22) Filed: Nov. 28, 2016

(65) Prior Publication Data

US 2017/0078870 A1    Mar. 16, 2017

Related U.S. Application Data

(63) Continuation of application No. 14/664,739, filed on Mar. 20, 2015, now Pat. No. 9,510,186.

(Continued)

(51) Int. Cl.
*H04W 8/18* (2009.01)
*G06F 3/06* (2006.01)
(Continued)

(52) U.S. Cl.
CPC .......... *H04W 8/183* (2013.01); *G06F 3/0622* (2013.01); *G06F 3/0637* (2013.01); *G06F 3/0665* (2013.01); *G06F 3/0673* (2013.01); *G06F 12/0223* (2013.01); *H04W 8/205* (2013.01); *G06F 2212/1052* (2013.01); *G06F 2212/177* (2013.01)

(58) Field of Classification Search
CPC ..... H04W 8/183; H04W 8/205; G06F 3/0622; G06F 3/0665; G06F 3/0673; G06F 12/0223; G06F 2212/1052; G06F 2212/177

See application file for complete search history.

(56) References Cited

U.S. PATENT DOCUMENTS

| 2014/0073375 A1* | 3/2014 | Li | H04W 4/001 455/558 |
| 2015/0350878 A1* | 12/2015 | Li | H04W 8/183 455/558 |
| 2015/0350879 A1* | 12/2015 | Li | H04W 8/183 455/558 |

* cited by examiner

*Primary Examiner* — Olumide T Ajibade Akonai
*Assistant Examiner* — Eboni Hughes
(74) *Attorney, Agent, or Firm* — Downey Brand LLP (57) ABSTRACT

Disclosed herein are various techniques for preventing or at least partially securing parameters—e.g., Type parameters—of electronic Subscriber Identity Modules (eSIMs) stored within an embedded Universal Integrated Circuit Card (eUICC) from being inappropriately modified by mobile network operators (MNOs). One embodiment sets forth a technique that involves modifying file access properties of the Type parameters of eSIMs to make the Type parameters readable, but not updatable by the MNOs. Another embodiment sets forth a technique that involves implementing eSIM logical containers that separate the Type parameters from the eSIM data within the eUICC, such that the Type parameters are inaccessible to the MNOs. Yet another embodiment sets forth a technique that involves implementing an Operating System (OS)-based registry that is inaccessible to the MNOs and manages Type parameters for the eSIMs that are stored by the eUICC.

20 Claims, 9 Drawing Sheets

Related U.S. Application Data

(60) Provisional application No. 61/975,665, filed on Apr. 4, 2014.

(51) Int. Cl.
*H04W 8/20* (2009.01)
*G06F 12/02* (2006.01)

TAMPER PREVENTION FOR ELECTRONIC SUBSCRIBER IDENTITY MODULE (ESIM) TYPE PARAMETERS

CROSS-REFERENCE TO RELATED APPLICATIONS

The present application is a continuation of U.S. application Ser. No. 14/664,739, filed Mar. 20, 2015, entitled "TAMPER PREVENTION FOR ELECTRONIC SUBSCRIBER IDENTITY MODULE (eSIM) TYPE PARAMETERS," set to issue on Nov. 29, 2016 as U.S. Pat. No. 9,510,186, which claims the benefit of U.S. Provisional Application No. 61/975,665, entitled "TAMPER PREVENTION FOR ELECTRONIC SUBSCRIBER IDENTITY MODULE (eSIM) TYPE PARAMETERS," filed Apr. 4, 2014, the content of which is incorporated herein by reference in its entirety for all purposes.

FIELD

The described embodiments set forth various techniques for protecting Type parameters associated with electronic Subscriber Identity Modules (eSIMs).

BACKGROUND

Most mobile devices are configured to receive and operate removable Universal Integrated Circuit Cards (UICCs) that enable the mobile devices to access services provided by mobile network operators (MNOs). In particular, each UICC includes at least a microprocessor and a read-only memory (ROM), where the ROM is configured to store different applets and authentication data that the mobile device can utilize to register and interact with the MNOs. Typically, a UICC takes the form of a small removable card (e.g., a SIM card) that is configured to store a single MNO profile and be inserted into a UICC-receiving bay included in a mobile device. In more recent implementations, however, UICCs are being embedded directly into system boards of mobile devices and are configured to store multiple MNO profiles (e.g., electronic SIMs (eSIMs))—e.g., one eSIM for a local MNO, and another eSIM for an international MNO. Notably, these embedded UICCs (eUICCs) provide several advantages over traditional, removable UICCs. For example, some eUICCs include a rewritable memory that can facilitate eSIM updates for accessing extended features provided by MNOs. EUICCs can also eliminate the necessity of including UICC-receiving bays within mobile devices. The implementation of eUICCs therefore not only increases the flexibility of mobile devices, but also simplifies their design and frees up space for other components.

Despite the foregoing advantages provided by eUICCs, new challenges continue to arise with respect to maintaining a high level of security and robustness while providing the increased flexibility. Consider, for example, a common scenario that involves a new, out-of-the-box mobile device whose eUICC stores only one eSIM. In this example, the eSIM is associated with a Type parameter that indicates to the eUICC that the eSIM is a bootstrap-type eSIM that can be used to access a limited service provided by an MNO (e.g., a subscription registration service). In turn, the eUICC activates the bootstrap-type eSIM, and, when a user of the mobile device completes the subscription registration service, an operator-type eSIM that enables the mobile device to access standard services provided by the MNO (e.g., voice calls and internet) is downloaded and stored into the eUICC. Consider further that, at a subsequent time, the MNO issues to the eUICC an over-the-air (OTA) update that erroneously updates the Type parameter associated with the operator-type eSIM and causes the operator-type eSIM to become a bootstrap-type eSIM. Consequently, when the mobile device power cycles and interfaces with the eUICC to obtain access to the MNO, only two bootstrap-type eSIMs are identified by the eUICC and the mobile device is prevented from accessing the standard services provided by the MNO. This not only creates confusion for the user, but could potentially send the user back to the registration process that he or she already completed, thereby degrading the user's overall experience.

SUMMARY

Representative embodiments set forth herein disclose various techniques for preventing or at least partially securing Type parameters of electronic Subscriber Identity Modules (eSIMs) stored within an embedded Universal Integrated Circuit Card (eUICC) from being inappropriately modified by mobile network operators (MNOs).

One embodiment sets forth a method for protecting a Type parameter of an electronic Subscriber Identity Module (eSIM) that is associated with an MNO. Specifically, the method is implemented at an eUICC that stores the eSIM, and includes the steps of: receiving a request to store the eSIM within a memory that is accessible to the eUICC, and, in response to the request: (1) storing the eSIM into the memory, (2) parsing a file system of the eSIM to identify the Type parameter, and (3) updating a file access property of the Type parameter to prevent the Type parameter from being modified by the MNO.

Another embodiment sets forth a different method for protecting a Type parameter of an eSIM that is associated with an MNO. Specifically, the method is implemented at an eUICC that stores the eSIM, and includes the steps of: receiving a request to store the eSIM within a memory that is accessible to the eUICC, and, in response to the request: (1) establishing, within the memory, a logical container for the eSIM, (2) establishing, within the logical container, at least a first logical sub-container and a second logical sub-container, wherein the first logical sub-container is accessible to the MNO and the second logical sub-container is not accessible to the MNO, (3) storing the eSIM into the first logical sub-container, and (4) storing the Type parameter into the second logical sub-container.

Yet another embodiment sets forth another method for protecting a Type parameter of an eSIM that is associated with an MNO. Specifically, the method is implemented at an eUICC that stores the eSIM, and includes the steps of: receiving a request to store the eSIM within a memory that is accessible to the eUICC, and, in response to the request: (1) storing the eSIM into the memory, and (2) storing the Type parameter into an Operating System (OS) registry, wherein the OS registry is inaccessible to the MNO.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Other aspects and advantages of the embodiments described herein will become apparent from the following detailed description taken in conjunction with the accompanying drawings which illustrate, by way of example, the principles of the described embodiments.

BRIEF DESCRIPTION OF THE DRAWINGS

The included drawings are for illustrative purposes and serve only to provide examples of possible structures and arrangements for the disclosed inventive apparatuses and methods for providing wireless computing devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

DETAILED DESCRIPTION

Representative applications of apparatuses and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

In accordance with various embodiments described herein, the terms "wireless communication device," "wireless device," "mobile device," "mobile station," and "user equipment" (UE) may be used interchangeably herein to describe one or more common consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) LTE, LTE Advanced (LTE-A), and/or 5G or other present or future developed advanced cellular wireless networks.

The wireless communication device, in some embodiments, can also operate as part of a wireless communication system, which can include a set of client devices, which can also be referred to as stations, client wireless devices, or client wireless communication devices, interconnected to an access point (AP), e.g., as part of a WLAN, and/or to each other, e.g., as part of a WPAN and/or an "ad hoc" wireless network. In some embodiments, the client device can be any wireless communication device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; or other present or future developed IEEE 802.11 technologies.

Additionally, it should be understood that the UEs described herein may be configured as multi-mode wireless communication devices that are also capable of communicating via different third generation (3G) and/or second generation (2G) RATs. In these scenarios, a multi-mode UE can be configured to prefer attachment to LTE networks offering faster data rate throughput, as compared to other 3G legacy networks offering lower data rate throughputs. For instance, in some implementations, a multi-mode UE may be configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

A typical eSIM includes, by way of standardized practice, a Type parameter that indicates a manner in which the eSIM should be utilized by a mobile device. The Type parameter of an eSIM can be set to indicate, for example, that the eSIM is a bootstrap-type eSIM or an operator-type eSIM. A bootstrap-type eSIM can be used by the mobile device to access limited services—such as subscription registration services—provided by a particular MNO. In contrast, an operator-type eSIM can be used by the mobile device to access standard services—such as voice and data services—provided by a particular MNO. According to most configurations, when a mobile device powers-on, the mobile device interfaces with the eUICC to identify a most-appropriate eSIM to be selected and activated. Consequently, complications can occur when the Type parameter of an eSIM is erroneously updated, e.g., by way of a corrupted OTA update originating from an MNO that results in multiple bootstrap-type eSIMs.

In view of the foregoing deficiencies, the embodiments described herein set forth various techniques for providing the benefit of preventing or at least partially securing the Type parameters of eSIMs from being inappropriately modified. One embodiment sets forth an eSIM file system approach that can be used to achieve the foregoing benefit. Specifically, when an eSIM is received by and stored within the eUICC, the eUICC modifies the file access properties for the Type parameter of the eSIM in a manner that enables the Type parameter to be read by the associated MNO, but not updated or deleted by the associated MNO. In this manner, when an OTA update issued by the MNO erroneously attempts to modify the Type parameter of the eSIM, the Type parameter is preserved and the likelihood of resulting complications can be reduced.

Another embodiment sets forth an approach that involves establishing eSIM logical containers that can prevent or at least partially secure Type parameters of eSIMs from being erroneously updated. Specifically, this embodiment involves establishing, within a secure area of a memory that is accessible to the eUICC, a logical container for an eSIM that is to be managed by the eUICC. The embodiment further involves establishing, within the logical container of the eSIM, at least a first logical sub-container and a second logical sub-container. The first logical sub-container is configured to store the eSIM and, in general, represents a domain that is accessible to the MNO (e.g., when performing OTA updates). In contrast, the second logical sub-container is configured to store the Type parameter of the eSIM, and represents a domain that is not accessible to the MNO. The configuration of the eUICC is then updated in a manner that causes the second logical sub-container to be referenced when attempting to identify the Type parameter of the eSIM that is stored in the first logical sub-container. In this manner, the integrity of the Type parameter can remain intact even when the MNO issues an OTA update that would otherwise cause the Type parameter to be erroneously updated.

Yet another embodiment sets forth an OS-based registry that can be implemented to prevent or at least partially secure Type parameters of eSIMs from being erroneously updated. Specifically, this embodiment involves maintaining an OS-based registry (e.g., a registry managed by an OS that executes within the eUICC) that is configured to store Type parameters for eSIMs that are managed by the eUICC. According to this embodiment, the OS-based registry is configured to be inaccessible to the MNOs with which the eSIMs are associated. The OS-based registry is kept synchronized with the eSIMs that are stored by the eUICC, e.g., the OS-based registry is updated when an eSIM is added or deleted. Moreover, a configuration of the eUICC is set such that the OS-based registry is referenced when attempting to identify the Type parameter of an eSIM that is managed by the eUICC. In this manner, erroneous OTA updates issued by the MNOs are less likely to impact the correctness of the managed Type parameters as the OS maintains a logical barrier between the OS-based registry and the MNOs.

Accordingly, the foregoing embodiments are directed toward preventing MNOs from modifying Type parameters of eSIMs. In some cases, however, it can be desirable to selectively enable MNOs to modify Type parameters of eSIMs, e.g., when an MNO desires to convert a bootstrap-type eSIM to an operator-type eSIM. This can be beneficial, for example, when a machine-to-machine activation occurs, e.g., when a vehicle is purchased and an onboard communication system is activated, and it is undesirable for the vehicle to be required to download/install a new eSIM. According to some embodiments, the eUICC can implement this functionality by enforcing a security policy (or policies) that identify, for example, particular MNOs that have read/write permissions to Type parameters. The security policy can reflect, for example, business agreements that exist between the eUICC manufacturer and the MNOs, such that the eUICC operates in an appropriate manner.

Accordingly, the foregoing approaches provide techniques for preventing or at least partially securing the Type parameters of eSIMs from being modified. Although the techniques described herein are directed toward prevention of tampering with Type parameters, it is noted that the same techniques can be applied to any data parameter of an eSIM. For example, in most cases, each eSIM is associated with a Unique Identifier parameter that is specific to the eSIM and should remain constant throughout the lifetime of the eSIM. As a result, it also can be desirable to apply the tamper prevention techniques described herein to the Unique Identifier parameter in addition to the Type parameter. A more detailed discussion is provided below and described in conjunction with FIGS. 1-2, 3A-3B, 4A-4B, 5A-5B, and 6, which illustrate detailed diagrams of different systems and methods that can be used to implement these techniques.

Figure 1:
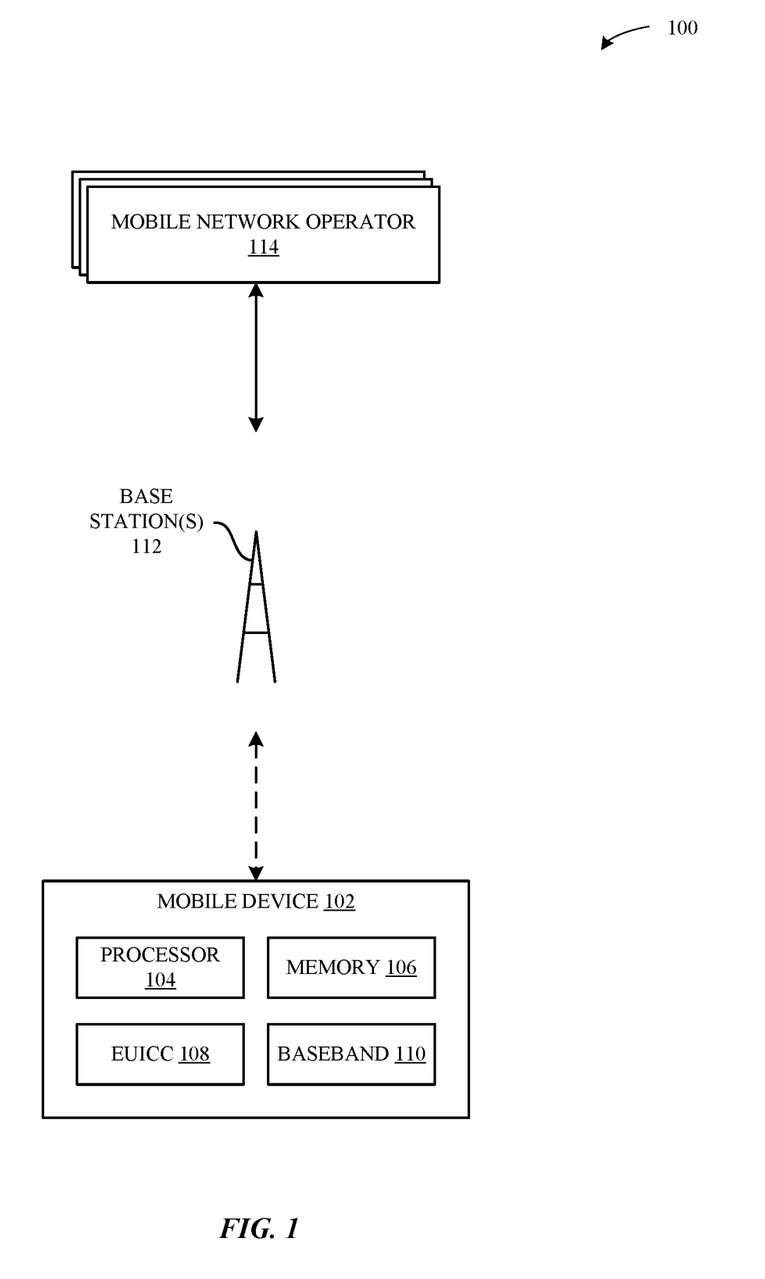
FIG. 1 illustrates a block diagram of different components of a system configured to implement the various techniques described herein, according to some embodiments.

FIG. 1 illustrates a block diagram of different components of a system 100 that is configured to implement the various techniques described herein, according to some embodiments. More specifically, FIG. 1 illustrates a high-level overview of the system 100, which, as shown, includes a mobile device 102, one or more base stations 112, and one or more MNOs 114. According to one embodiment, the mobile device 102 represents a wireless communication device (e.g., a smart phone, a tablet, a laptop, etc.) that is capable of communicating with at least one of the MNOs 114 via at least one of the base stations 112. As shown in FIG. 1, the mobile device 102 can include a processor 104, a memory 106, an eUICC 108, and a baseband component 110. The eUICC 108 can represent, for example, a hardware component that is embedded within a system board of the mobile device 102 and is configured to provide a more flexible environment than traditional, removable UICCs (e.g., SIM cards). As described in greater detail below, the eUICC 108 can include a variety of hardware/software components that enable the eUICC 108 to manage different parameters (e.g., Type parameters) of eSIMs according to the techniques described herein.

Figure 2:
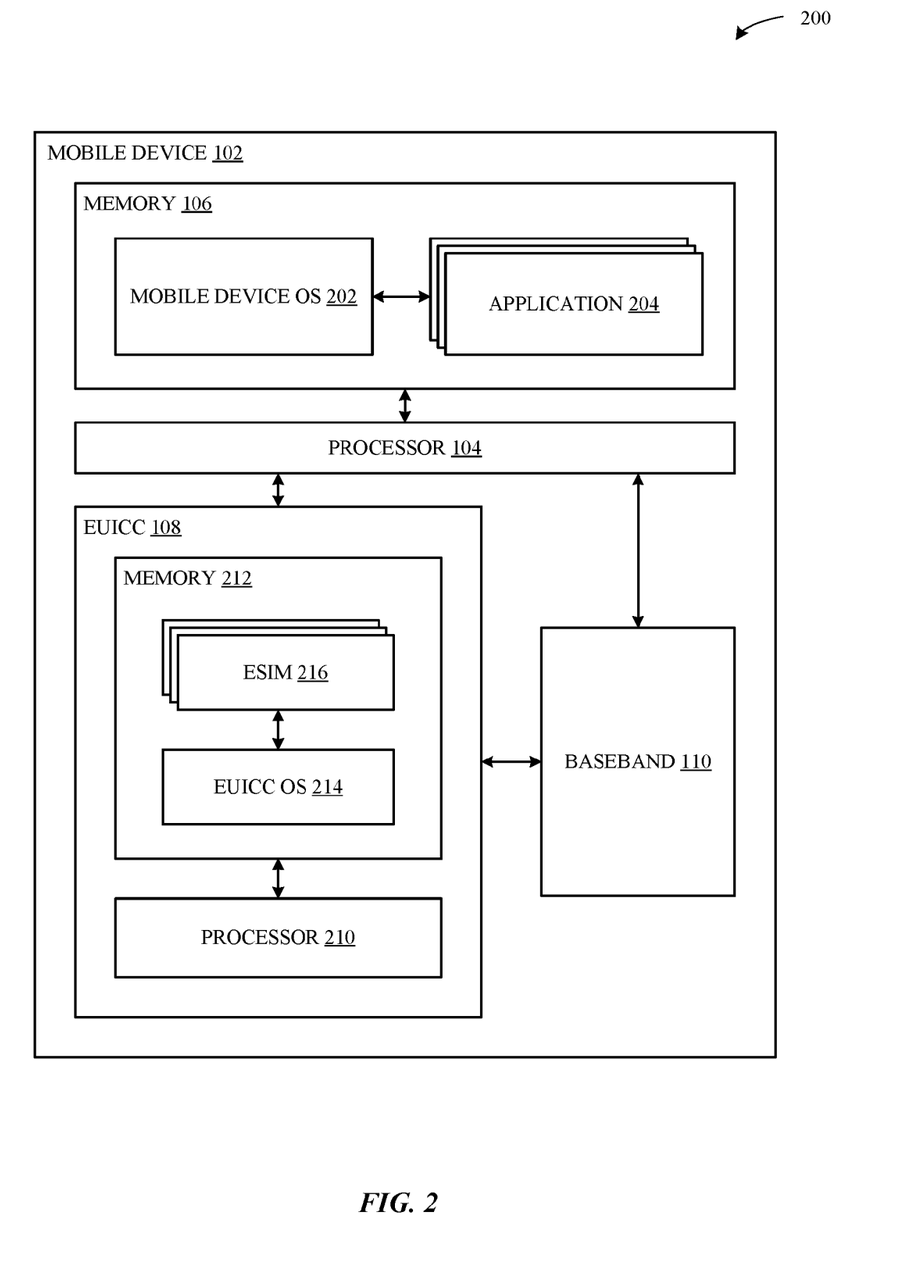
FIG. 2 illustrates a block diagram of a more detailed view of particular components of the system of FIG. 1, according to some embodiments.

FIG. 2 illustrates a more detailed view 200 of the mobile device 102 of FIG. 1, according to one embodiment. As shown in FIG. 2, a mobile device OS 202 and one or more applications 204 can execute on the mobile device 102 by way of the processor 104 and the memory 106. FIG. 2 also illustrates various hardware/software components that can be included in the eUICC 108. More specifically, the eUICC 108 can include a processor 210 and a memory 212 that collectively enable an eUICC OS 214 to execute within the eUICC 108 and manage one or more eSIMs 216. According to this configuration, the processor 104, the processor 210, and the baseband component 110 can work in conjunction to enable the mobile device 102 to access services provided by at least one of the MNOs 114.

Figure 3A:
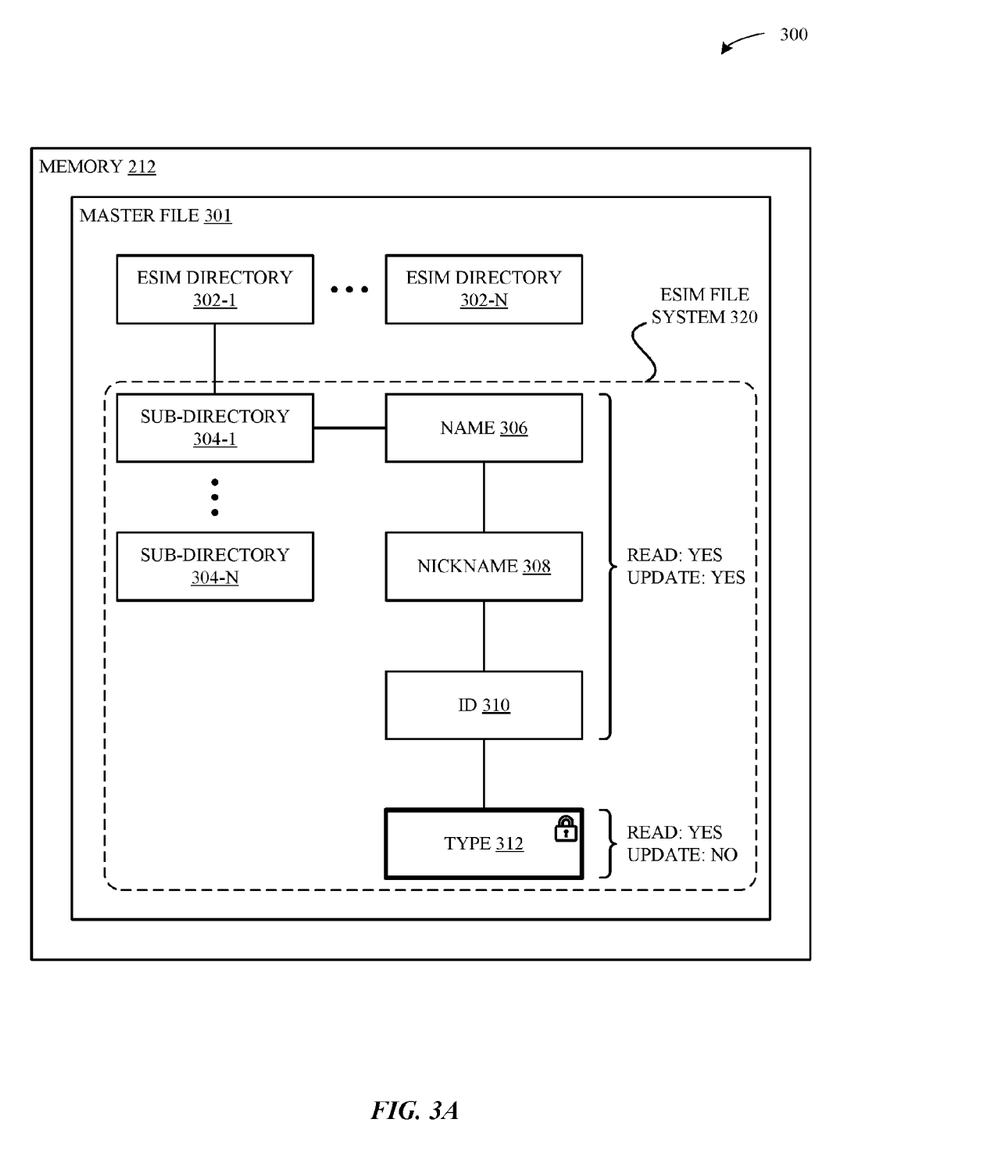
FIG. 3A illustrates block diagram of an eSIM file system approach that can be implemented to prevent or at least partially secure Type parameters of eSIMs from being erroneously updated, according to some embodiments.

FIG. 3A illustrates block diagram 300 of an eSIM file system approach that can be implemented to prevent or at least partially secure Type parameters of eSIMs 216 from being erroneously updated, according to some embodiments. As shown in FIG. 3A, the eSIM file system approach involves storing, within the memory 212 of the eUICC 108, a master file 301 that includes at least one eSIM directory 302 for an eSIM 216 that is managed by the eUICC 108. In particular, each eSIM directory 302 sets forth an eSIM file system 320 that can include sub-directories 304 that are configured to store various data components that make up the eSIM 216. For example, in FIG. 3A, the sub-directory 304-1 stores various high-level parameters for the eSIM 216, including a Name parameter 306, a Nickname parameter 308, an Identification (ID) parameter 310, and a Type parameter 312. As shown in FIG. 3A, the file access properties for the Name parameter 306, the Nickname parameter 308, and the ID parameter 310 are set as both readable and updatable by the MNO 114 that is associated with the eSIM 216. In contrast, the file access properties for the Type parameter 312 are set to be readable by entities that are external to the eUICC 108 (e.g., the baseband component 110, the MNO 114, etc.), but not updatable by the external entities. In this manner, when an OTA update issued by the MNO 114 erroneously attempts to modify the Type parameter 312 of the eSIM 216, the Type parameter 312 is preserved and the likelihood of resulting complications can be reduced.

Figure 3B:
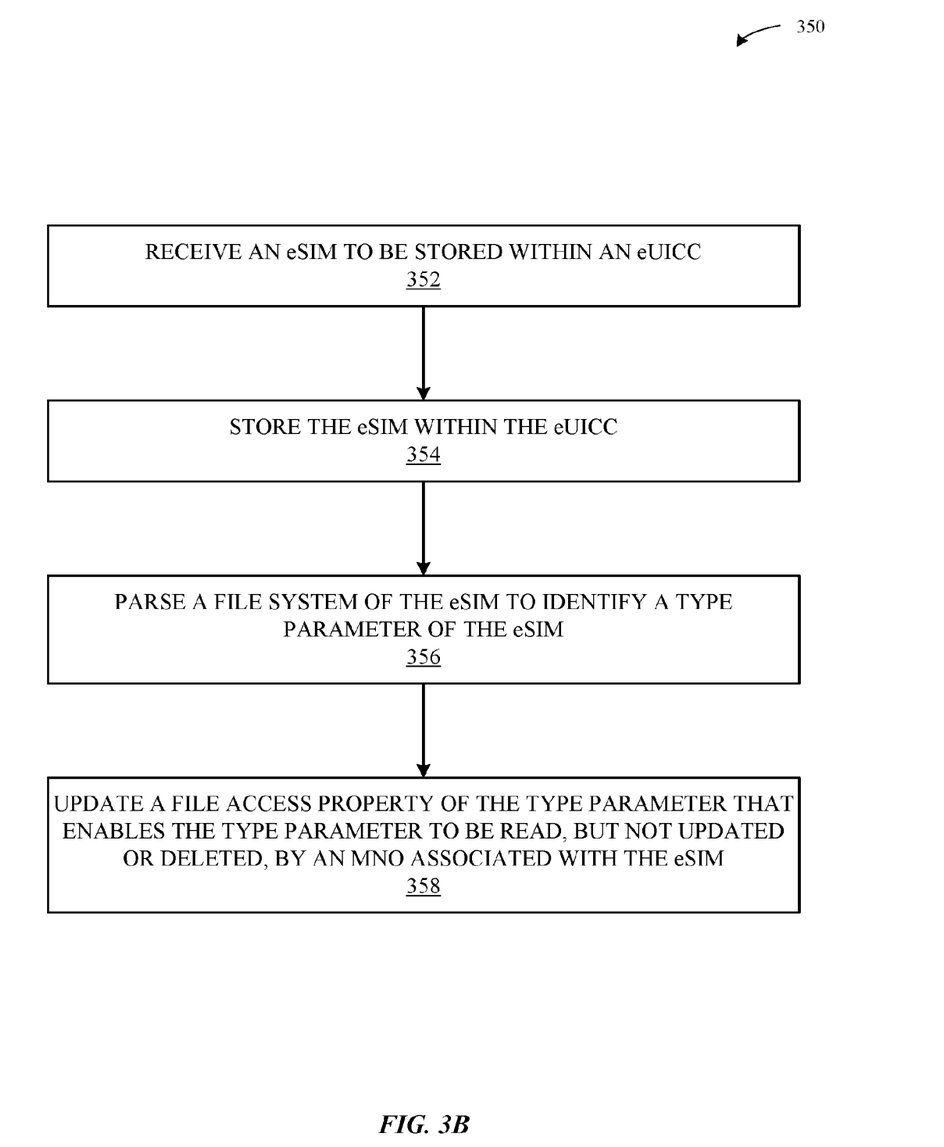
FIG. 3B illustrates a method for an eSIM file system approach that can be implemented to prevent or at least partially secure Type parameters of eSIMs from being erroneously updated, according to some embodiments.

FIG. 3B illustrates a method 350 for an eSIM file system 320 approach that can be implemented to prevent or at least partially secure Type parameters 312 (as shown in FIG. 3A) of eSIMs 216 from being erroneously updated, according to some embodiments. As shown in FIG. 3A, the method 350 begins at step 352, where the eUICC OS 214 receives an eSIM 216 to be stored within the eUICC 108. Notably, the eSIM 216 is typically received from an MNO 114, although the embodiments set forth herein are not so limited. At step 354, the eUICC OS 214 stores the eSIM 216 within the eUICC 108. At step 356, the eUICC OS 214 parses the eSIM file system 320 of the eSIM 216 to identify the Type parameter 312 of the eSIM 216. At step 358, the eUICC OS 214 updates a file access property of the Type parameter 312 that enables the Type parameter 312 to be read, but not updated, by an MNO 114 associated with the eSIM 216.

Figure 4A:
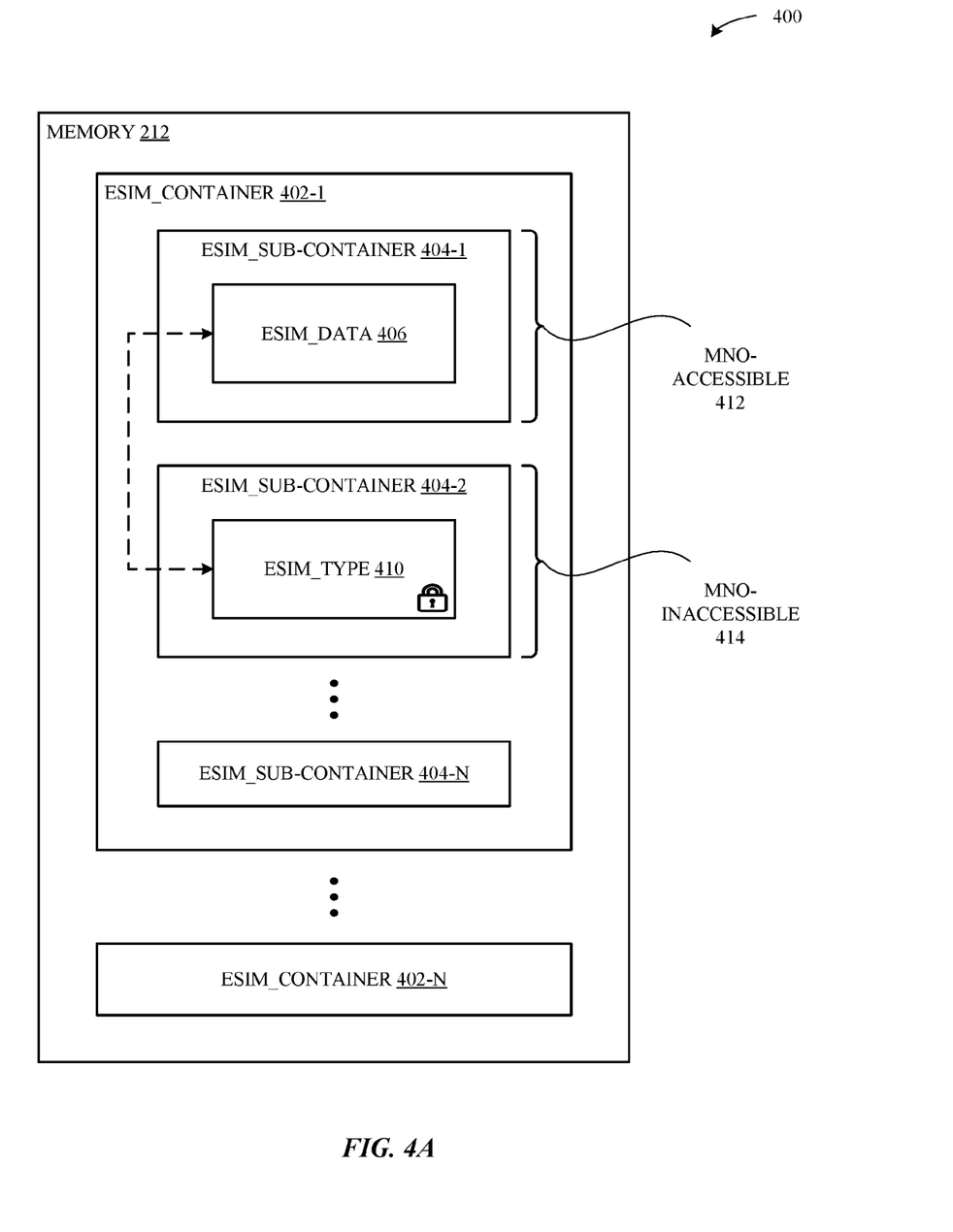
FIG. 4A illustrates block diagram of eSIM logical containers that can be implemented to prevent or at least partially secure Type parameters of eSIMs from being erroneously updated, according to some embodiments.

FIG. 4A illustrates block diagram 400 of eSIM logical containers that can be implemented to prevent or at least partially secure Type parameters of eSIMs 216 from being erroneously updated, according to some embodiments. As shown in FIG. 4A, the memory 212 can be utilized to implement at least one eSIM logical container 402 for an eSIM 216 that is managed by the eUICC 108. Specifically, within each eSIM logical container 402, there exists at least a first logical sub-container 404-1 and a second logical sub-container 404-2. As also shown in FIG. 4A, the first logical sub-container 404-1 is configured to store eSIM data 406 that makes up the eSIM 216. Notably, the first logical sub-container 404-1 represents a domain that is accessible to the MNO 114 (as indicated by element 412 in FIG. 4A) associated with the eSIM 216 whose eSIM data 406 is stored in the first logical sub-container 404-1. In contrast, the second logical sub-container 404-2 is configured to store a Type parameter (labeled as Type parameter 410 in FIG. 4A) of the eSIM 216. Notably, the second logical sub-container 404-2 represents a domain that is not accessible to the MNO 114 (as indicated by element 414 in FIG. 4A). Accordingly, the eUICC 108 is configured such that the second logical sub-container 404-2 is referenced when attempting to identify the Type parameter 410 of the eSIM 216 whose eSIM data 406 is stored in the first logical sub-container 404-1. In this manner, the integrity of the Type parameter 410 can remain intact even when the MNO 114 issues an OTA update that attempts to erroneously update the Type parameter 410.

Figure 4B:
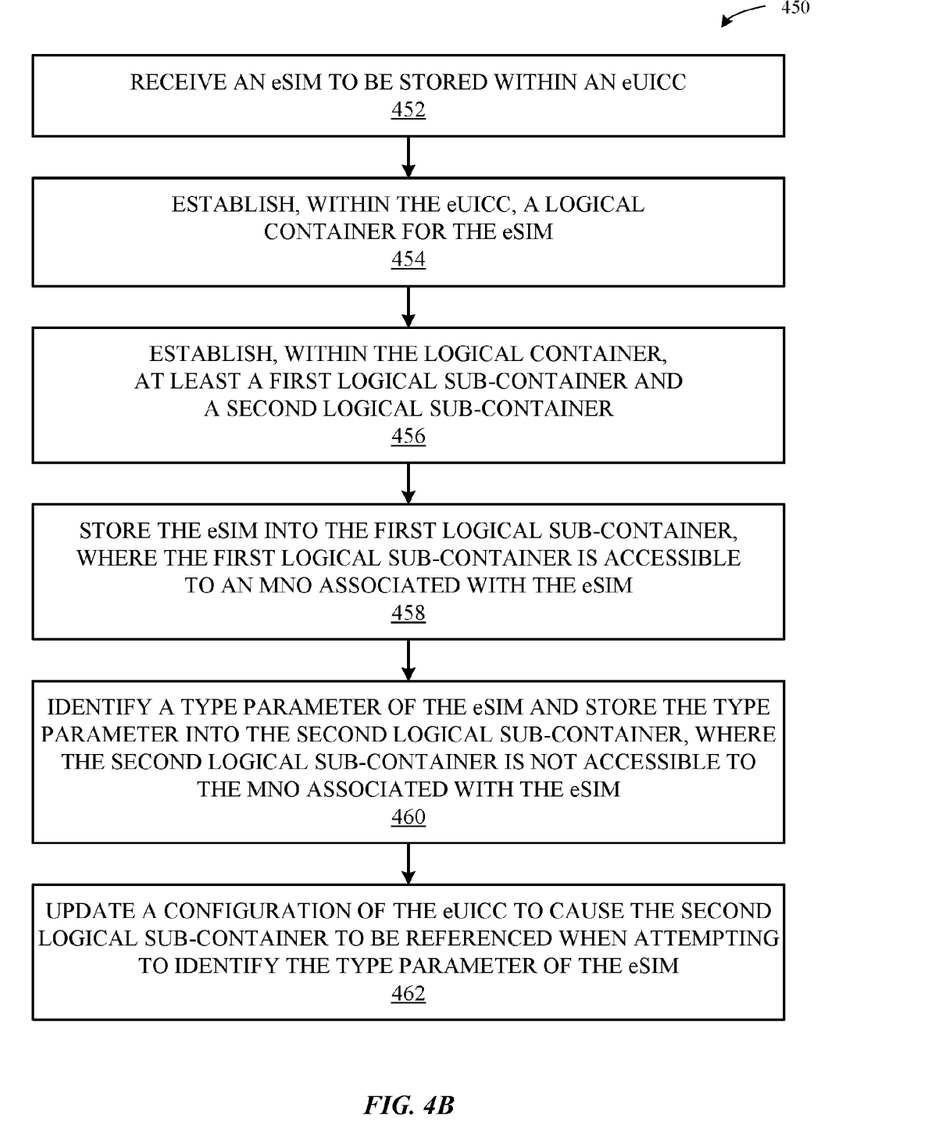
FIG. 4B illustrates a method for establishing eSIM logical containers that can be implemented to prevent or at least partially secure Type parameters of eSIMs from being erroneously updated, according to some embodiments.

FIG. 4B illustrates a method 450 for establishing eSIM logical containers 402 that can be implemented to prevent or at least partially secure Type parameters 410 of eSIMs 216 from being erroneously updated, according to some embodiments. As shown in FIG. 4B, the method 450 begins at step 452, where the eUICC OS 214 receives an eSIM 216 to be stored within the eUICC 108. At step 454, the eUICC OS 214 establishes, within the eUICC 108, an eSIM logical container 402 for the eSIM 216. At step 456, the eUICC OS 214 establishes, within the eSIM logical container 402, at least a first logical sub-container 404-1 and a second logical sub-container 404-2. At step 458, the eUICC OS 214 stores the eSIM 216 (as eSIM data 406) into the first logical sub-container 404-1, where the first logical sub-container 404-1 is accessible to an MNO 114 associated with the eSIM 216. At step 460, the eUICC OS 214 identifies the Type parameter 410 of the eSIM 216 and stores the Type parameter 410 into the second logical sub-container 404-2, where the second logical sub-container 404-2 is not accessible to the MNO 114 associated with the eSIM 216. At step 462, the eUICC OS 214 updates a configuration of the eUICC 108 to cause the second logical sub-container 404-2 to be referenced when attempting to identify the Type parameter 410 of the eSIM 216.

Figure 5A:
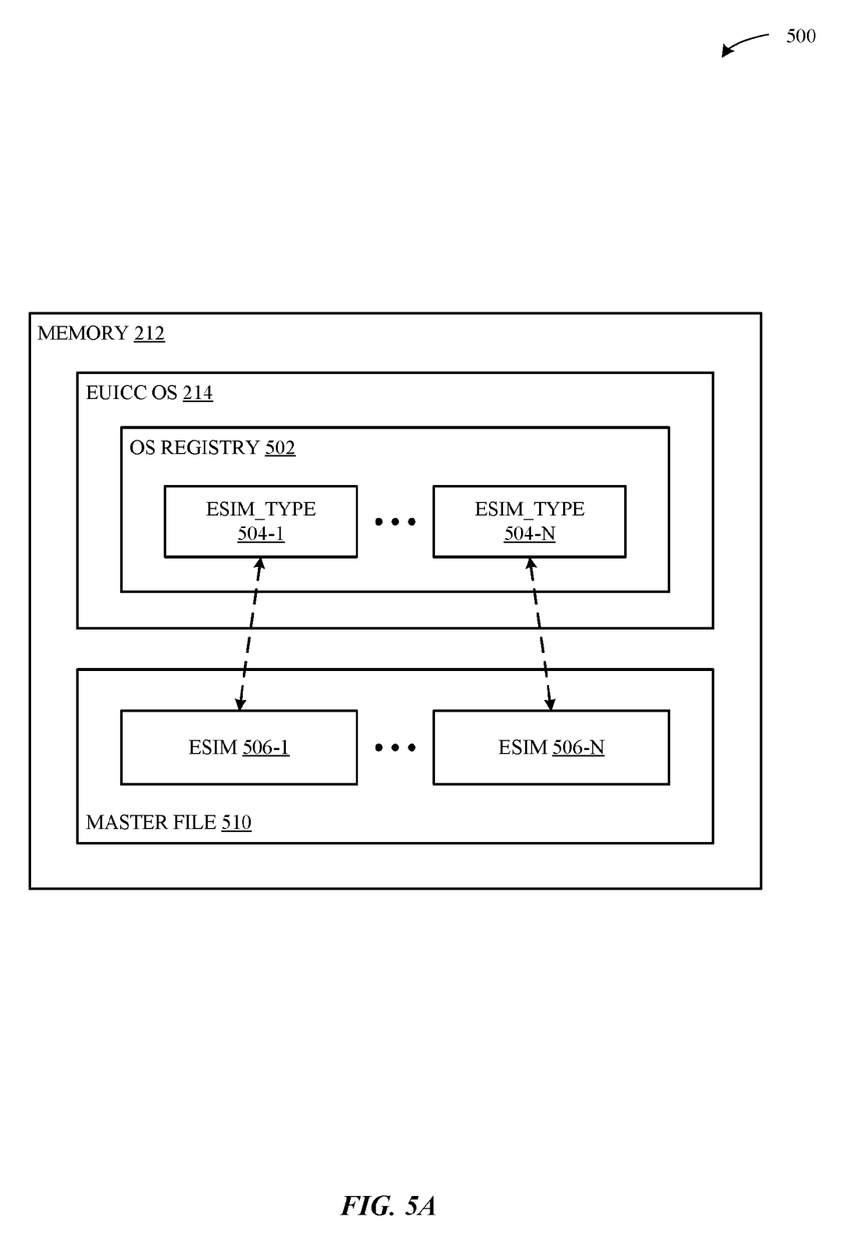
FIG. 5A illustrates a block diagram of an operating system (OS)-based registry that can be implemented to prevent or at least partially secure Type parameters of eSIMs from being erroneously updated, according to some embodiments.

FIG. 5A illustrates a block diagram 500 of an OS-based registry that can be implemented to prevent or at least partially secure Type parameters of eSIMs 216 from being erroneously updated, according to some embodiments. As shown in FIG. 5A, the memory 212 of the eUICC 108 can be utilized by the eUICC OS 214 to implement an OS registry 502. Specifically, the OS registry 502 is configured to store Type parameters 504 for eSIMs 216 whose eSIM data 506 is stored in a master file 510 managed by the eUICC 108. According to one embodiment, the OS registry 502 is configured to be inaccessible to the MNOs 114 with which the eSIMs 216 are associated. Notably, the OS registry 502 is kept synchronized with the eSIMs 216 that are stored by the eUICC 108, e.g., the OS registry 502 is updated when an eSIM 216 is added to the master file 510 or deleted from the master file 510. Moreover, a configuration of the eUICC 108 is set such that the OS registry 502 is referenced when attempting to identify the Type parameter 504 of the eSIM 216 that is managed by the eUICC 108. In this manner, erroneous OTA updates issued by the MNOs 114 are less likely to impact the correctness of the managed Type parameters 504 as the eUICC OS 214 maintains a logical barrier between the OS registry 502 and the MNOs 114.

Figure 5B:
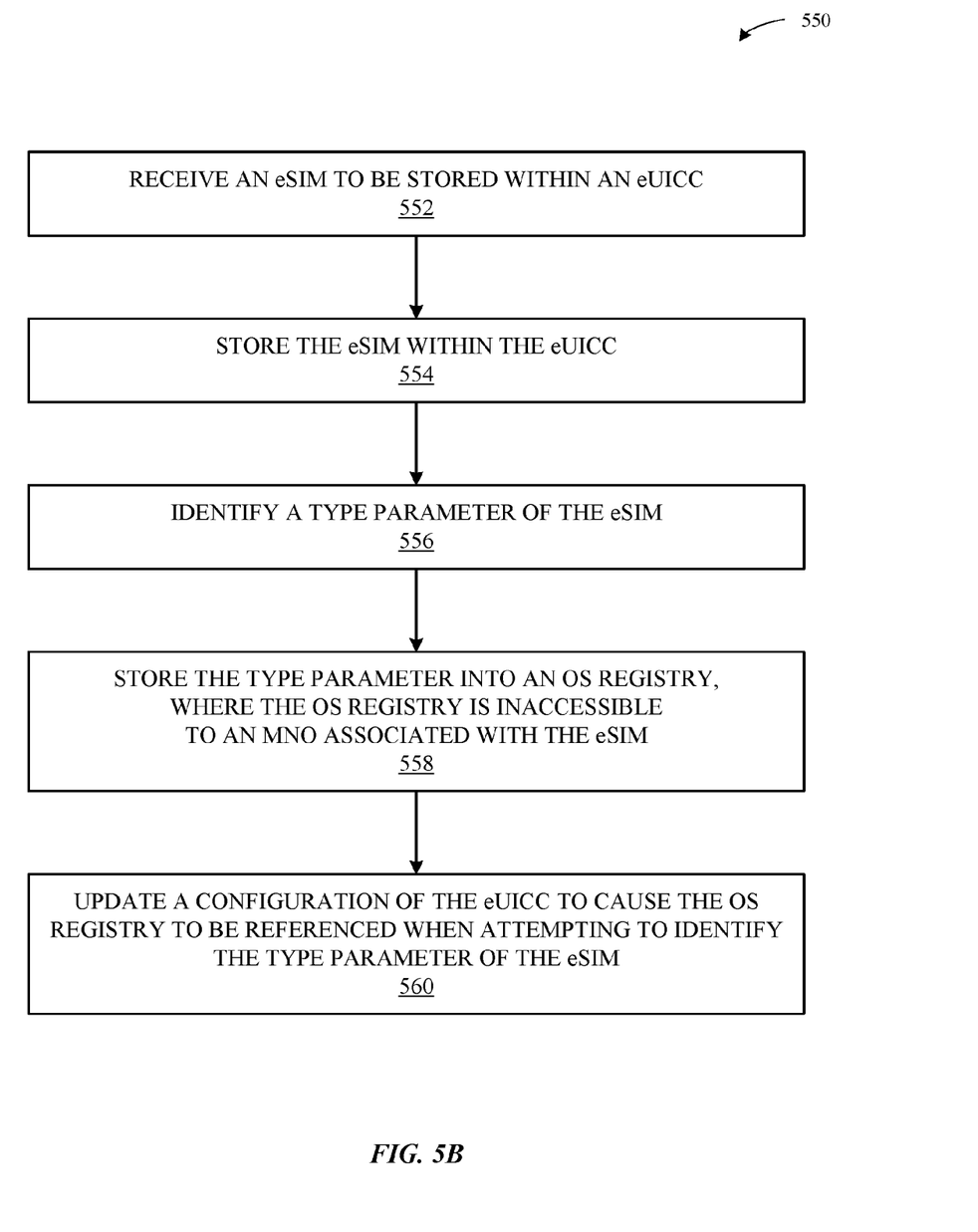
FIG. 5B illustrates a method for providing an operating system (OS)-based registry that can be implemented to prevent or at least partially secure Type parameters of eSIMs from being erroneously updated, according to some embodiments.

FIG. 5B illustrates a method 550 for providing an OS registry 502 that can be implemented to prevent or at least partially secure Type parameters 504 of eSIMs 216 from being erroneously updated, according to some embodiments. As shown, the method 550 begins at step 552, where the eUICC OS 214 receives an eSIM 216 to be stored within the eUICC 108. At step 554, the eUICC OS 214 stores the eSIM 216 (as eSIM data 506) within the eUICC 108. At step 556, the eUICC OS 214 identifies a Type parameter 504 of the eSIM 216. At step 558, the eUICC OS 214 stores the Type parameter 504 into the OS registry 502, where the OS registry 502 is inaccessible to an MNO 114 associated with the eSIM 216. At step 560, the eUICC OS 214 updates a configuration of the eUICC 108 to cause the OS registry 502 to be referenced when attempting to identify the Type parameter 504 of the eSIM 216.

Figure 6:
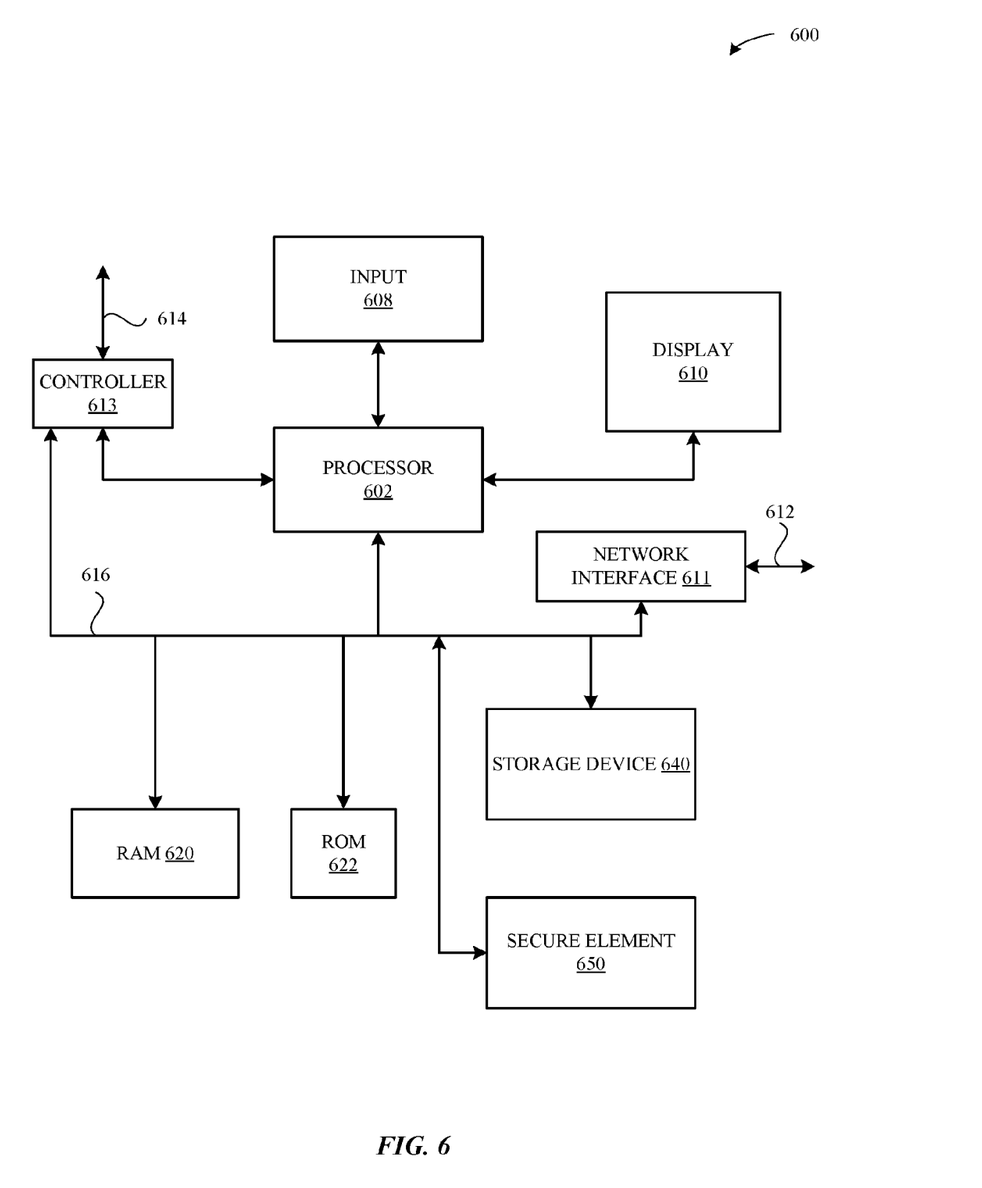
FIG. 6 illustrates a detailed view of a computing device that can be used to implement the various components described herein, according to some embodiments.

FIG. 6 illustrates a detailed view of a computing device 600 that can be used to implement the various components described herein, according to some embodiments. In particular, the detailed view illustrates various components that can be included in the mobile device 102 illustrated in FIG. 1. As shown in FIG. 6, the computing device 600 can include a processor 602 that represents a microprocessor or controller for controlling the overall operation of computing device 600. The computing device 600 can also include a user input device 608 that allows a user of the computing device 600 to interact with the computing device 600. For example, the user input device 608 can take a variety of forms, such as a button, keypad, dial, touch screen, audio input interface, visual/image capture input interface, input in the form of sensor data, etc. Still further, the computing device 600 can include a display 610 (screen display) that can be controlled by the processor 602 to display information to the user. A data bus 616 can facilitate data transfer between at least a storage device 640, the processor 602, and a controller 613. The controller 613 can be used to interface with and control different equipment through and equipment control bus 614. The computing device 600 can also include a network/bus interface 611 that couples to a data link 612. In the case of a wireless connection, the network/bus interface 611 can include a wireless transceiver.

The computing device 600 also include the storage device 640, which can represent a single storage device or multiple storage devices, and includes a storage management module that manages one or more partitions within the storage device 640. In some embodiments, storage device 640 can include solid state memory or the like. The computing device 600 can also include a Random Access Memory (RAM) 620 and a Read-Only Memory (ROM) 622. The ROM 622 can store programs, utilities or processes to be executed in a non-volatile manner. The RAM 620 can provide volatile data storage, and stores instructions related to the operation of the different software processes described herein. When the computing device 600 represents a mobile device 102, the computing device 600 can further include a secure element 650 that can represent the eUICC 108 illustrated in FIGS. 1-2 and described in detail herein.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, hard disk drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for protecting a unique identifier of an electronic Subscriber Identity Module (eSIM) that is associated with a Mobile Network Operator (MNO), the method comprising:
at an embedded Universal Integrated Circuit Card (eUICC) included in a mobile device:
receiving a request to store the eSIM within a memory that is accessible to the eUICC; and
in response to the request:
storing the eSIM into the memory,
parsing a file system of the eSIM to identify the unique identifier, and
updating a file access property of the unique identifier to prevent the unique identifier from being modified by the MNO.

2. The method of claim 1, wherein the mobile device is configured to access wireless services provided by the MNO.

3. The method of claim 2, wherein a Type parameter of the eSIM indicates that the eSIM is a bootstrap-type eSIM that enables the mobile device to access standard services provided by the MNO.

4. The method of claim 2, wherein a Type parameter of the eSIM indicates that the eSIM is an operator-type eSIM that enables the mobile device to access standard services provided by the MNO.

5. The method of claim 1, wherein the memory is a component of the eUICC.

6. The method of claim 1, further comprising:
updating the file access property of the unique identifier to enable the unique identifier to be read by the MNO.

7. The method of claim 1, wherein, subsequent to updating the file access property, the eUICC remains capable of modifying the unique identifier.

8. The method of claim 1, further comprising:
parsing the file system of the eSIM to identify a Type parameter associated with the eSIM, and
updating a file access property of the Type parameter to prevent the type parameter from being modified by the MNO.

9. A method for protecting a unique identifier associated with an electronic Subscriber Identity Module (eSIM) that is associated with a Mobile Network Operator (MNO), the method comprising:
at an embedded Universal Integrated Circuit Card (eUICC) included in a mobile device:
receiving a request to store the eSIM within a memory that is accessible to the eUICC; and
in response to the request:
establishing, within the memory, a logical container for the eSIM,
establishing, within the logical container, at least a first logical sub-container and a second logical sub-container, wherein:
the first logical sub-container is accessible to the MNO, and
the second logical sub-container is not accessible to the MNO,
storing the eSIM into the first logical sub-container, and storing the unique identifier into the second logical sub-container.

10. The method of claim 9, further comprising:
updating a configuration of the eUICC to cause the second logical sub-container to be referenced when attempting to identify the unique identifier of the eSIM.

11. The method of claim 9, wherein the mobile device is configured to access wireless services provided by the MNO.

12. The method of claim 11, wherein a Type parameter of the eSIM indicates that the eSIM is a bootstrap-type eSIM that enables the mobile device to subscribe to access standard services provided by the MNO.

13. The method of claim 11, wherein a Type parameter of the eSIM indicates the eSIM is an operator-type eSIM that enables the mobile device to access standard services provided by the MNO.

14. The method of claim 9, wherein, for each eSIM managed by the eUICC, there exists a corresponding logical container.

15. A method for protecting a unique identifier associated with an electronic Subscriber Identity Module (eSIM) that is associated with a Mobile Network Operator (MNO), the method comprising:
at an embedded Universal Integrated Circuit Card (eUICC) included in a mobile device:
receiving a request to store the eSIM within a memory that is accessible to the eUICC; and
in response to the request:
storing the eSIM into the memory, and
storing the unique identifier into a registry of an Operating System (OS), wherein the ROM registry is inaccessible to the MNO.

16. The method of claim 15, wherein, for each eSIM managed by the eUICC, there exists a corresponding unique identifier stored in the registry.

17. The method of claim 15, further comprising:
updating a configuration of the eUICC to cause the registry to be referenced when attempting to identify the unique identifier of the eSIM.

18. The method of claim 15, wherein, subsequent to storing the unique identifier into the registry, the eUICC remains capable of modifying the unique identifier.

19. The method of claim 15, further comprising:
storing a Type parameter associated with the eSIM into the registry, wherein:
the Type parameter indicates that the eSIM is a bootstrap-type eSIM that enables the mobile device to subscribe to access standard services provided by the MNO, or
the Type parameter indicates that the eSIM is an operator-type eSIM that enables the mobile device to access standard services provided by the MNO.

20. The method of claim 19, wherein the OS executes on the eUICC.

* * * * *

UNITED STATES PATENT AND TRADEMARK OFFICE
CERTIFICATE OF CORRECTION

PATENT NO. : 9,736,678 B2
APPLICATION NO. : 15/362732
DATED : August 15, 2017
INVENTOR(S) : Li et al.

It is certified that error appears in the above-identified patent and that said Letters Patent is hereby corrected as shown below:

In Claim 15, Column 12, Lines 4-5: "wherein the ROM registry is inaccessible" should read --wherein the registry is inaccessible--.

Signed and Sealed this
Twenty-first Day of November, 2017

Joseph Matal
*Performing the Functions and Duties of the*
*Under Secretary of Commerce for Intellectual Property and*
*Director of the United States Patent and Trademark Office*